(12) United States Patent
Christmas et al.

(10) Patent No.: US 11,740,456 B2
(45) Date of Patent: Aug. 29, 2023

(54) HOLOGRAPHIC PROJECTOR AND METHOD HAVING RELATIVE MOTION BETWEEN INPUT BEAM AND SPATIAL LIGHT MODULATOR

(71) Applicant: Dualitas Ltd, Knowlhill (GB)

(72) Inventors: Jamieson Christmas, Knowlhill (GB); Alexander Cole, Knowlhill (GB)

(73) Assignee: Dualitas Ltd, Milton Keynes (GB)

( * ) Notice: Subject to any disclaimer, the term of this patent is extended or adjusted under 35 U.S.C. 154(b) by 0 days.

(21) Appl. No.: 16/824,213

(22) Filed: Mar. 19, 2020

(65) Prior Publication Data

US 2020/0301143 A1 Sep. 24, 2020

(30) Foreign Application Priority Data

Mar. 22, 2019 (GB) ..................... 1903934

(51) Int. Cl.
*G03H 1/16* (2006.01)
*G02B 27/01* (2006.01)
*G03H 1/22* (2006.01)

(52) U.S. Cl.
CPC .......... *G02B 27/0103* (2013.01); *G03H 1/16* (2013.01); *G03H 1/2205* (2013.01); *G03H 1/2294* (2013.01); *G03H 2225/32* (2013.01); *G03H 2225/52* (2013.01)

(58) Field of Classification Search
None
See application file for complete search history.

(56) References Cited

U.S. PATENT DOCUMENTS

| 2008/0247022 | A1 | 10/2008 | Yamauchi et al. | |
|---|---|---|---|---|
| 2010/0027083 | A1* | 2/2010 | Kroll | G03H 1/02 359/9 |
| 2011/0043876 | A1* | 2/2011 | Kurashige | G02B 5/32 359/15 |
| 2013/0170005 | A1 | 7/2013 | Kurashige et al. | |
| 2013/0265622 | A1 | 10/2013 | Christmas et al. | |

(Continued)

FOREIGN PATENT DOCUMENTS

| CN | 101622568 A | 1/2010 |
|---|---|---|
| CN | 109388016 A | 2/2019 |

(Continued)

OTHER PUBLICATIONS

UKIPO Combined Search and Examination Report under Sections 17 & 18(3), GB Application No. 1903934.6, dated Sep. 26, 2019, 7 pages.

(Continued)

*Primary Examiner* — Jennifer D. Carruth
(74) *Attorney, Agent, or Firm* — McDonnell Boehnen Hulbert & Berghoff LLP

(57) ABSTRACT

There is provided a holographic projector comprising a spatial light modulator, a light source and an assembly. The spatial light modulator is arranged to display a hologram. The light source is arranged to illuminate at least one region of the spatial light modulator with an input beam such that the input beam is spatially modulated by the spatial light modulator in accordance with the hologram to form a holographic reconstruction. The assembly is arranged to move at least one of the input beam and the spatial light modulator relative to the other.

18 Claims, 13 Drawing Sheets

(56) References Cited

U.S. PATENT DOCUMENTS

| | | |
|---|---|---|
| 2014/0022526 A1 | 1/2014 | Van Eijk et al. |
| 2014/0253987 A1 | 9/2014 | Christmas |
| 2015/0234351 A1 | 8/2015 | Alon-Braitbart et al. |
| 2017/0082855 A1 | 3/2017 | Christmas et al. |
| 2017/0115627 A1 | 4/2017 | Christmas et al. |
| 2017/0299869 A1 | 10/2017 | Urey et al. |
| 2017/0363869 A1 | 12/2017 | Christmas et al. |
| 2018/0046138 A1 | 2/2018 | Christmas et al. |
| 2018/0120768 A1 | 5/2018 | Christmas |
| 2018/0188532 A1 | 7/2018 | Christmas et al. |
| 2018/0284693 A1 | 10/2018 | Sung et al. |
| 2019/0041641 A1 | 2/2019 | Christmas et al. |
| 2019/0041797 A1 | 2/2019 | Christmas et al. |
| 2019/0064738 A1 | 2/2019 | Cole et al. |
| 2019/0361396 A1 | 11/2019 | Christmas |

FOREIGN PATENT DOCUMENTS

| | | |
|---|---|---|
| EP | 3314324 B1 | 6/2016 |
| EP | 3408711 B1 | 12/2019 |
| GB | 2496108 A | 5/2013 |
| GB | 2526275 A | 11/2015 |
| GB | 2552851 A | 2/2018 |
| GB | 2554472 B2 | 4/2018 |
| GB | 2554575 A | 4/2018 |
| GB | 2567409 A | 4/2019 |
| GB | 2567410 A | 4/2019 |
| GB | 2569206 A | 6/2019 |
| GB | 2569208 A | 6/2019 |
| JP | H11337888 A | 12/1999 |
| JP | 6318659 B | 5/2018 |
| WO | 2016/105284 A1 | 6/2016 |
| WO | 2016105282 A | 6/2016 |
| WO | 2018078366 A1 | 5/2018 |
| WO | 2018100394 A1 | 6/2018 |
| WO | 2018100397 A1 | 6/2018 |
| WO | 2019224052 A | 11/2019 |

OTHER PUBLICATIONS

Igarashi S. et al., "Efficient tiled calculation of over-1 0-gigapixel holograms using ray-wavefront conversion", Optics Express 26, 8 (2018).

Wyrowski, F., et al., "Speckle-free reconstruction in digital holography," Journal of the Optical Society, vol. 6, No. 8, Aug. 1989, pp. 1171-1174.

\* cited by examiner

HOLOGRAPHIC PROJECTOR AND METHOD HAVING RELATIVE MOTION BETWEEN INPUT BEAM AND SPATIAL LIGHT MODULATOR

CROSS-REFERENCE TO RELATED APPLICATIONS

This application claims the benefit of priority of United Kingdom Patent Application no. 1903934.6, filed Mar. 22, 2019, which is hereby incorporated herein by reference in its entirety.

FIELD

The present disclosure relates to a projector. More specifically, the present disclosure relates to a holographic projector or a holographic projection system. Some aspects relate to a head-up display and a head-mounted display. Some aspects relate to a method of improving the quality of the holographic image formed by a holographic projector.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel transform or Fourier transform. These types of holograms may be referred to as Fresnel or Fourier holograms. A Fourier hologram may be considered as a Fourier domain representation of the object or a frequency domain representation of the object. A CGH may also be calculated by coherent ray tracing or a point cloud technique, for example.

A CGH may be displayed, represented, or otherwise encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. not comprised of pixels) and light modulation may therefore be continuous across the device. The SLM may be reflective, meaning that modulated light is output from the SLM in reflection. The SLM may equally be transmissive, meaning that modulated light is output from the SLM is transmission.

A holographic projector for imaging may be provided using the described technology. Such projectors have found application in head-up displays, "HUD", and head-mounted displays, "HMD", including near-eye devices, for example.

The projector forms an image on a replay plane. More specifically, an image is holographically-reconstructed on a replay plane which is downstream of the display device. The holographically formed image is made up of a plurality of light spots. The light spots have some irregularity and unevenness which can affect the overall quality of the image perceived by the viewer.

Speckle is the consequence of using highly coherent light sources to form an image. In particular, speckle is the result of interference of many waves having the same frequency but different phases (and in some cases different amplitudes). The different phases cause the waves to interfere to give a resultant wave whose amplitude, and therefore intensity, varies randomly. It is desirable to reduce such speckle, since speckle degrades the quality of the image.

The present disclosure describes an approach with increases the sharpness of the light spots which are holographically formed on the replay plane and reduces laser speckle.

SUMMARY

Aspects of the present disclosure are defined in the appended independent claims.

There is provided a holographic projector comprising: a spatial light modulator arranged to display a hologram; a light source arranged to illuminate at least one region of the spatial light modulator with first light such that the first light is spatially modulated by the spatial light modulator in accordance with the hologram to form second light, wherein the second light forms a holographic reconstruction on a light receiving surface spatially separated from the spatial light modulator; and a controller-driven assembly arranged to move at least one of the first light and the spatial light modulator relative to the other, optionally, whilst the holographic reconstruction remains formed on the light-receiving surface.

There is provided a method of improving a holographic image, comprising: displaying a hologram on a spatial light modulator; illuminating at least one region of the spatial light modulator with first light; spatially modulating the first light in accordance with the hologram to form second light, wherein the second light forms a holographic reconstruction on a light receiving surface spatially separated from the spatial light modulator; and moving at least one of the first light and the spatial light modulator relative to the other, optionally, whilst the holographic reconstruction remains formed on the light-receiving surface.

There is provided a holographic projector comprising: a spatial light modulator arranged to display a hologram; a light source arranged to illuminate at least one region of the spatial light modulator with an input beam such that the input beam is spatially modulated by the spatial light modulator in accordance with the hologram to form a holographic reconstruction; and an assembly arranged to move at least one of the input beam and the spatial light modulator relative to the other.

In accordance with the holographic projector and method, the holographic reconstruction is formed on a replay plane and is projected to form the holographic image. Moving the input beam relative to the SLM (or vice versa) has the effect of averaging the phase and brightness of the illuminating beam. This improves the light spots that are holographically-formed on the replay plane. More specifically, the shape of each light spot becomes more regular and the brightness profile of each light spot becomes more uniform. It may be said that the light spots are less blurred. This means that they are smaller. Smaller light spots represent an increase in the resolution of the display system. In summary, in accordance with embodiments, the light spots which make up the holographic image are smaller and sharper. This makes for a better display device.

The holographic projector also improves the image quality of a holographic reconstruction by reducing speckle. Moving at least one of the input beam and the spatial light modulator relative to the other can exploit any inherent non-uniformities in the light source and/or SLM to introduce a randomness in the resulting holographic reconstruction. This randomness manifests itself in different speckle patterns. Therefore, moving the input beam or SLM multiple times can average out the speckle patterns and improve the quality of the holographic reconstruction. In particular, moving the input beam to be incident at a plurality of different positions on the spatial light modulator whilst forming the holographic reconstruction can improve the appearance of the holographic image, since the human eye averages out the speckle patterns. It has been suggested that presenting in the order of 20 statistically independent speckle patterns within the integration time of the human eye (15-300 milliseconds, or ms, more typically 30-100 ms) enables a good smoothing out of any speckle pattern by the human eye.

In some embodiments, the assembly comprises an optical element arranged to receive the input beam on a first optical path and output the input beam on a second optical path. Optionally, the second optical path is substantially parallel to but spatially off-set from the first optical path. Alternatively, the second optical path can be angled relative to the first optical path. The first optical path is that followed by the input beam prior to movement or displacement thereof by the assembly. Optical elements such as lenses or mirrors can be used to translate or displace the optical path of the input beam. In other embodiments, the optical element is a parallel-face plate (otherwise known as a parallel-face window or parallel-face optical window). A parallel-face plate is a transparent optical plate formed with parallel faces to ensure minimal angular deviation. Preferably, the parallel-face plate is inclined with respect to an axis parallel to the first optical axis of the input beam—this inclination acts to produce a translation or other deviation in the beam position.

In some embodiments, the assembly may be arranged to rotate the optical element (the parallel-face plate or other optical element such as a lens or a mirror) in order to rotate the second optical path around an axis parallel to the first optical axis. Optionally, the axis parallel to the first optical axis is collinear with the first optical axis. Since the input beam has a spatial light profile, translating or rotating the light beam in this way acts to translate or rotate the profile of the light beam illuminating the SLM such that a different spatial profile illuminates a region of the SLM with each movement.

The assembly may be arranged to move the input beam and/or the spatial light modulator in a direction perpendicular to the first optical path of the input beam of light. For example, the light beam can be moved in a circular motion relative to the first optical path or in a linear direction along an axis which intersects the first optical path. The assembly may be arranged to move at least one of the input beam and the spatial light modulator along an axis perpendicular to the first optical path of the input beam. The linear direction in which the input beam and/or the spatial light modulator are moved can be horizontal and/or vertical relative to the first optical path. This relative movement displaces the input beam from the first optical path to a second optical path which is spatially displaced relative to the first optical path, but optionally which remains parallel to the first optical path.

In other embodiments, the assembly is arranged to tilt the input beam and/or the spatial light modulator relative to a normal of the first optical path of the input beam.

In other embodiments, the assembly may be arranged to move the input beam relative to the spatial light modulator by electrical signals rather than mechanically (e.g. by rotation). For example, the assembly may comprise an acousto-optic deflector (AOD) arranged to receive the input beam on a first optical path and output the input beam on a second optical path. This is achieved by diffraction of the input beam as it travels through a light propagation medium carrying an acoustic wave (typically travelling across the path of the input beam. The direction of the second output path can be changed by changing an electrically controlled acoustic drive signal applied to the light propagation medium to generate the acoustic wave. The change in direction of the second output path moves the input beam relative to the SLM (e.g. to a different position on the SLM). For example, the input beam may be moved in response to a change in the frequency of an oscillating radio-frequency (RF) drive signal applied to a piezo-electric transducer attached to the light propagation medium. The changes in RF drive signal leads to change in the diffraction angle of the light beam. Thus, changes in the applied frequency of the RF drive signal may change the output angle of the light beam exiting the AOD so as to displace the input beam relative to the spatial light modulator.

In other embodiments, the input beam can be moved by any other suitable means. Moreover, the assembly can move the input beam continuously, or in a discrete manner. Alternatively, the assembly can comprise an optical element which is moved continuously, or in a discrete manner, to move the input beam. Such movement up and down, or such tilting or rotating can be achieved by movement of an optical element of the assembly, or by movement of the light source emitting the input beam. The SLM can additionally, or alternatively, be moved relative to the input beam. Varying the portion of the input beam which illuminates the SLM improves quality of a holographically-projected image.

Optionally, the hologram displayed by the SLM comprises two or more tiles, each representative of at least a part of an input hologram. The term "tile" is used herein to refer to a continuous set of pixels of a hologram (whole tile) or subset of pixels of a hologram (part tile). The input hologram is a hologram representative of the image to be reconstructed by the spatially modulated input beam (i.e. the holographic image to be projected by the holographic projector). The hologram displayed on the SLM is thus formed of different combinations of complete sets (whole tile) or subsets (part tiles) of pixels of the input hologram.

Optionally, at least one tile is a whole tile representative of a whole of the input hologram. Optionally, the whole tile displayed on the SLM remains illuminated by the input beam. This arrangement confers the below described benefits of tiling, which improves image quality, whilst further improving image quality through the relative movement of the input beam and the spatial light modulator. Optionally, the holographic projector is part of a system comprising a processor arranged to receive or generate the input hologram and form the hologram to be displayed by the SLM from the input hologram by tiling. The processor can be further arranged to transmit the hologram to the spatial light modulator for display.

In some embodiments, when the hologram displayed on the SLM is tiled, i.e. is comprised of whole and/or part tiles (representative of a whole or a part of an input hologram to be reconstructed on the light-receiving surface by the spatially modulated light), only part of the SLM may be illuminated by the input beam. In other words, a size of the at least one region of the SLM illuminated is smaller than the overall size of the display area of the SLM, i.e. a cross-sectional area of the input beam is smaller than the display area of the SLM and the SLM is "underfilled". Preferably, but not necessarily, the region or part of the SLM to be illuminated is the region comprising a whole tile. Thus, in some embodiments, the input beam is moved to a plurality of different positions in which a whole tile displayed on the SLM is illuminated thereby.

In other embodiments, the light source is arranged to illuminate all of the SLM and an area surrounding the SLM. In other words, the light source is arranged such that not only is all of the SLM illuminated, but the areas surrounding the SLM are also illuminated. In this way, the SLM is "overfilled" by the light incident upon it. This overfill ensures that all of the SLM pixels are illuminated at all times. The input beam can be moved in any desired manner to a plurality of different positions in which the SLM remains overfilled, such that the portion of the input beam incident on the SLM varies and any non-uniformities or variations in the input beam are exploited without a risk that a region of the SLM will not be illuminated with the input beam. As such, this overfill can remove constraints on the movement of the input beam or the SLM, since there is a greater degree of freedom in the relative movement of the input beam and the SLM. Where the SLM is fully illuminated, as well as some of the surrounding space, the hologram displayed on the SLM can be a tiled hologram, or can be an un-tiled hologram representative of the image to be reconstructed.

Optionally, the holographic reconstruction remains formed during the relative movement of the input beam and the spatial light modulator. In other words, the relative movement is such that the input beam is incident at a plurality of different positions on the SLM and either the whole of the SLM or at least one whole tile is illuminated at all times. When the SLM is overfilled, the holographic reconstruction does not move during the relative movement of the input beam and the spatial light modulator (providing angle of incidence is preserved). Optionally, the holographic reconstruction may be formed at a replay field in a replay plane. In this embodiment, there is no physical light-receiving surface (for example there is no screen or diffuser), but only a plane in space comprising an area at which the holographic reconstruction is formed. This arrangement can provide flexibility as to the projection of the holographic reconstruction. The replay plane can be spatially remote from the spatial light modulator or the projector. Optionally, the holographic reconstruction may be formed at a light receiving surface. Optionally, the light receiving surface is at the replay plane such that the holographic reconstruction is in focus on the light receiving surface. Optionally, the light receiving surface is spatially separated from the spatial light modulator or projector. Optionally, the holographic reconstruction remains formed on the light receiving surface whilst at least one of the input beam and the spatial light modulator are moved relative to the other.

Optionally, the light-receiving surface is a diffuser or a screen. When the holographic projector is implemented in a head-up display (HUD) for a vehicle, the light-receiving surface may be the windshield or windscreen, or it may be a separate diffuser on which the holographic reconstruction is formed, for example before projection onto the windscreen.

Optionally, the light source emits spatially coherent light and/or emits monochromatic light. Optionally, the light source is a laser.

Optionally, the spatial light modulator is a liquid crystal on silicon spatial light modulator. Optionally, the spatial light modulator is an optically addressed SLM. In embodiments, the spatial light modulator comprises a plurality of independently addressable pixels. Preferably, the SLM is arranged to spatially-modulate the phase and/or the amplitude of the light of the input beam. Optionally, the holographic reconstruction is formed by interference of the spatially modulated light; optionally, the holographic reconstruction is formed by interference of the spatially modulated light at the light receiving surface.

In some embodiments, the hologram displayed or represented on the SLM is a computer generated hologram. In other words, the hologram has been computed, rather than merely displayed or represented on the SLM. Optionally, when the hologram is a computer generated hologram, the computer generated hologram is a mathematical transformation of the holographic reconstruction. Optionally, the computer generated hologram is a Fourier transformation or a Fresnel transformation of the holographic reconstruction. Optionally, the computer generated hologram is a Fourier hologram or a Fresnel hologram. Optionally, the computer generated hologram is generated by a point cloud method.

In some embodiments, the holographic projector further comprises a controller arranged to drive the assembly. Alternatively, the holographic projector is part of a system comprising a controller arranged to drive the assembly. The controller can be arranged to drive the assembly to move at least one of the input beam and the spatial light modulator relative to the other. For example, the controller can be arranged to drive the assembly to drive motion of an optical element and thus move the position of the input beam relative to the SLM. Alternatively, the controller can be arranged to drive the assembly without moving an optical element thereof. For example, the controller can provide a drive signal to a piezo-electric transducer of an acousto-optic deflector or the like arranged to deflect the input beam, travelling through an optical element thereof, in different directions according to characteristics of the drive signal. Thus, by changing the drive signal, the position of the input beam can be moved relative to the SLM. Optionally, the controller can be arranged to drive the assembly to actuate the light source and/or spatial light modulator in a suitable manner to move at least one of the input beam and the spatial light modulator relative to the other.

It has been recognised that it is advantageous to introduce additional components early on in the holographic projector, or optical system, since the beam size is still small and thus the necessary mechanisms can be compact. For example, it can be better to move the SLM or input beam (by adjusting the optical path, moving the light source or SLM, or otherwise) relative to each other than to move downstream components, since this would be more difficult.

There is provided a method of improving a holographic reconstruction, comprising: displaying a hologram on a spatial light modulator; illuminating at least one region of the spatial light modulator with an input beam; spatially modulating the input beam in accordance with the hologram to form a holographic reconstruction; and moving at least one of the input beam and the spatial light modulator relative to the other.

Optionally, the holographic reconstruction remains formed whilst at least one of the input beam and the spatial light modulator are moving relative to the other. It may be said that the input beam may be moved to a plurality of different positions relative to the SLM whilst the holographic reconstruction remains formed, typically for a time period within the integration time of the human eye. In some embodiments, the holographic reconstruction is formed on a light receiving surface spatially separated from the spatial light modulator and, optionally, remains formed on the light receiving surface during the relative movement of the input beam and SLM.

The method may comprise inserting an optical element into a first optical path of the input beam to output the input beam on a second optical path. The second optical path may be substantially parallel to, but spatially off-set from, the first optical path and, optionally, the method further comprises rotating the optical element in order to rotate the second optical path around an axis parallel to the first optical axis.

Optionally, the movement of the at least one of the input beam and the spatial light modulator relative to the other is facilitated by an assembly. The assembly may be controller driven. The movement may be translation, rotation, or tilting and may be achieved by mechanical or non-mechanical means. Optionally, the assembly comprises the optical element. The optical element may be the above described parallel-face plate (otherwise known in the art as a parallel-face window), or another optical element such as a mirror or a lens. The assembly is in some embodiments arranged to rotate the optical element in order to rotate the second optical path around an axis parallel to the first optical axis. The axis parallel to the first optical axis is optionally collinear with the first optical axis. In other embodiments, the assembly is arranged to translate or otherwise displace the optical element in order to shift the input beam from a first optical path to a second optical path. The second optical path is not necessarily parallel to the first optical path. In other embodiments, the assembly is arranged to deflect the input beam travelling through an optical element using electrical signals, rather than mechanically, for example by means of an acousto-optic deflector (AOD) as described below. In embodiments, changing the deflection of the input beam travelling through the optical element changes the angle of the second optical path in order to move (displace or translate) the input beam across the plane of the SLM.

The method may further comprise tiling an input hologram to be reconstructed to form the hologram displayed on the spatial light modulator (SLM). Tiling comprising forming the hologram displayed by the SLM of two or more tiles, each tile representative of at least a part of the input hologram to be reconstructed. Optionally, at least one tile is a whole tile representative of a whole of the input hologram to be reconstructed. The tiling can be performed by a processor, for example, and the hologram to be displayed can be provided to the SLM for display.

Optionally, when the hologram is tiled using at least one whole tile (and one or more other whole tiles and/or part tiles), the method further comprises illuminating the at least one region of the SLM such that the at least one whole tile remains illuminated by the input beam during the relative movement of the input beam and/or spatial light modulator. Optionally, a size of the at least one region of the SLM is smaller than a size of the SLM. Alternatively, illuminating the at least one region of the SLM comprising illuminating all regions of the SLM and an area surrounding the SLM.

The method may further comprise a method of implementing any of the above described features of the holographic projector, as well as the alternative embodiments described herein. Any of the above described optional embodiments can be combined in any suitable combination.

The term "hologram" is used to refer to the recording which contains amplitude and/or phase information about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image" and "image region" refer to areas of the replay field illuminated by light forming the holographic reconstruction. Again, the "image" comprises discrete spots which may be referred to as "image spots" or "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" or "represent" a light modulation distribution in response to receiving the plurality of control values.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (modulation level) assigned to each pixel of the hologram has an amplitude and phase component. The value (modulation level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to 2Π) which represents the amount of phase retardation provided by that pixel. For example, a pixel of the spatial light modulator described as having a phase value of Π2 will change the phase of received light by Π/2 radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Reference is made throughout this disclosure to a parallel-face plate (or parallel-face window) optical element by way of example only. The present disclosure is not limited to such an optical element, and extends to other optical elements such as mirrors or lenses, or any other means of shifting an input beam from a first optical path to a second optical path different to the first optical path in order to realise the above described advantages of moving at least one of the input beam and SLM relative to the other.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
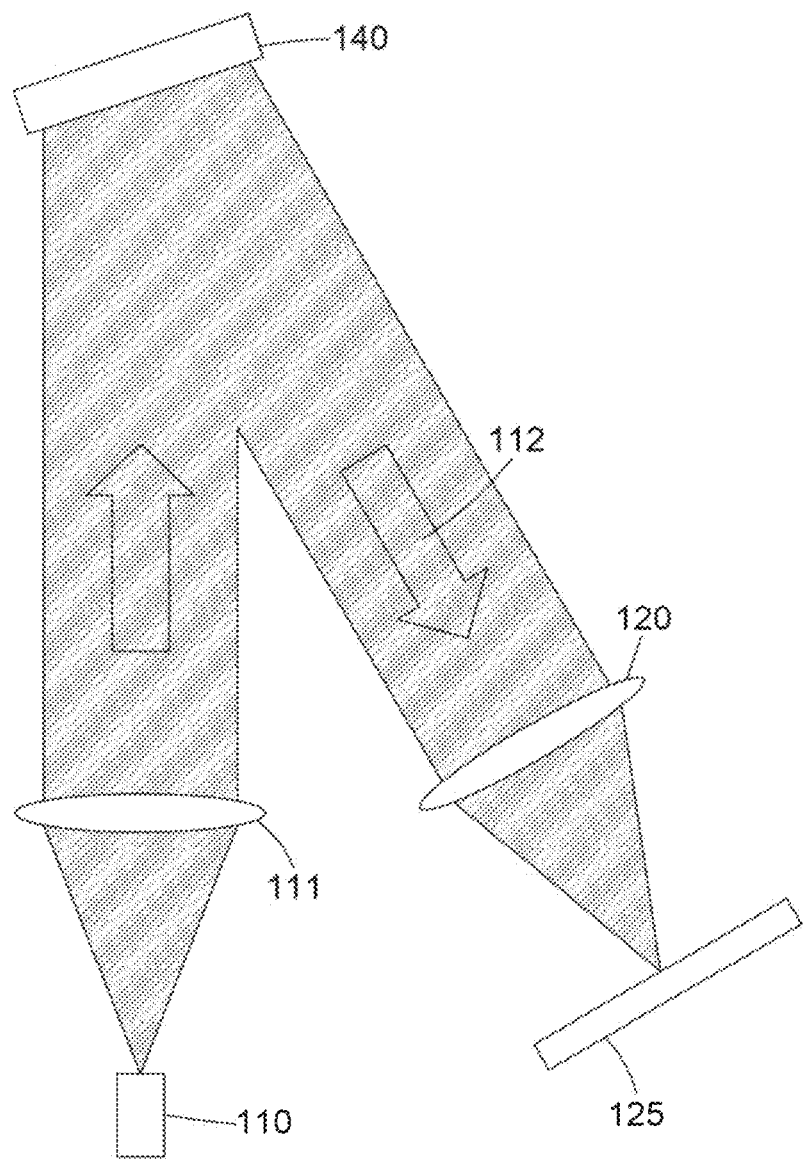
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
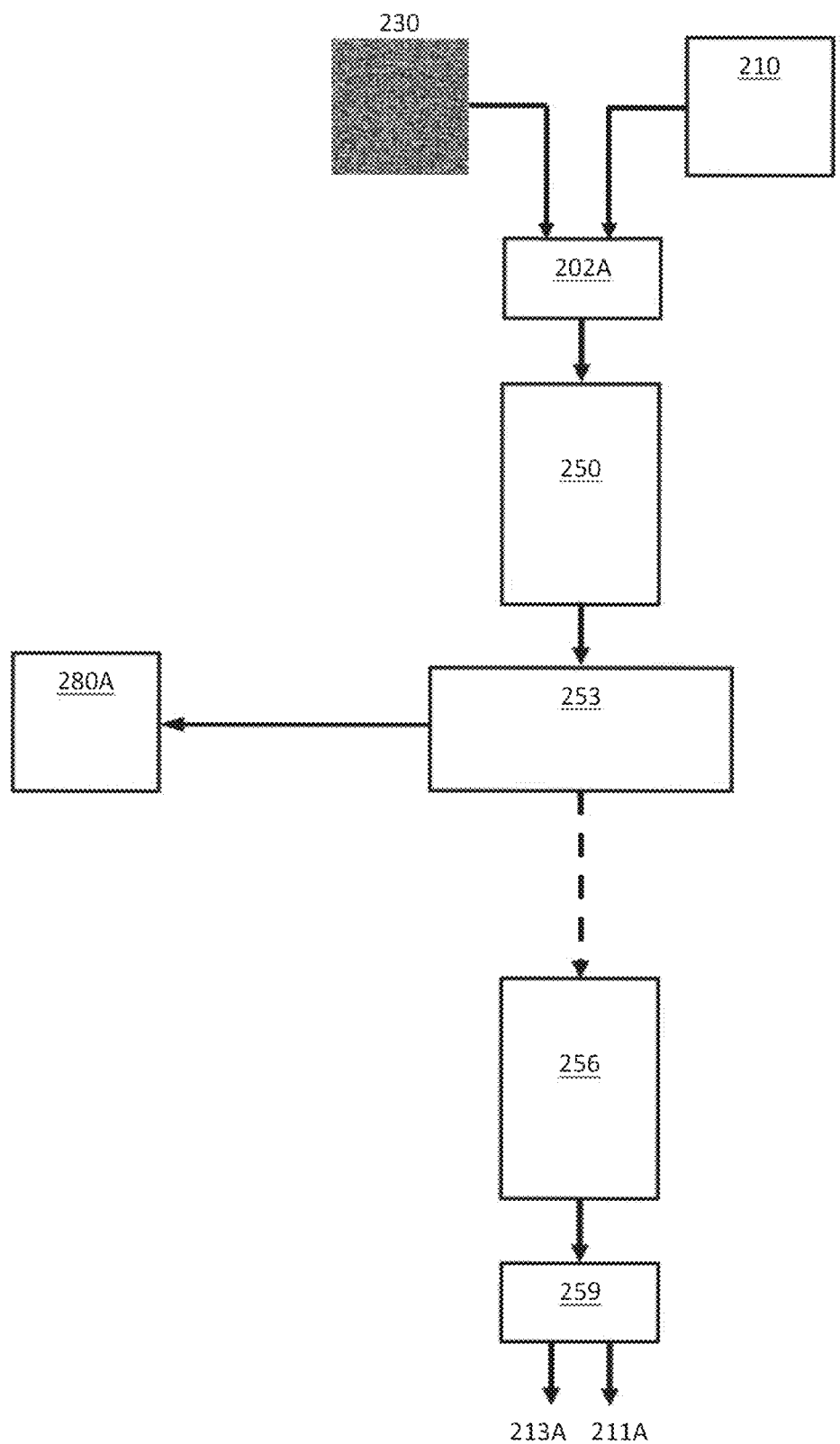
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and extracts the set of phase values. The second processing block 253 quantises each phase value to form hologram 280A. Each phase value is quantised in accordance with the phase-levels which may be represented on the pixels of the spatial light modulator which will be used to "display" the hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments). If the algorithm continues, second processing block 253 additionally replaces the magnitude values of the Fourier transformed complex data set with new magnitude values. The new magnitude values are a distribution of values representative of the magnitude distribution of the light pattern which will be used to illuminate the spatial light modulator. In some embodiments, each new magnitude value is unity. In other embodiments, second processing block 253 processes the magnitude values of the second complex data set—for example, performs a mathematical operation or series of mathematical operations on each magnitude value—to form the new magnitude values. Second processing block 253 outputs a complex data set comprising the quantised phase values and the new magnitude values.

Third processing block 256 receives the complex data set output by the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and assesses the distribution of magnitude values 211A. Specifically, the fourth processing block 259 compares the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 determines that the hologram 280A is acceptable. That is, if the difference between the distribution of magnitude values 211A and the input image 210 is sufficiently small, the fourth processing block 259 determines that the hologram 280A is a sufficiently-accurate representative of the input image 210. In some embodiments, the distribution of phase values 213A of the inverse Fourier transformed complex data set is ignored for the purpose of the comparison.

It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm is performed.

Figure 2B:
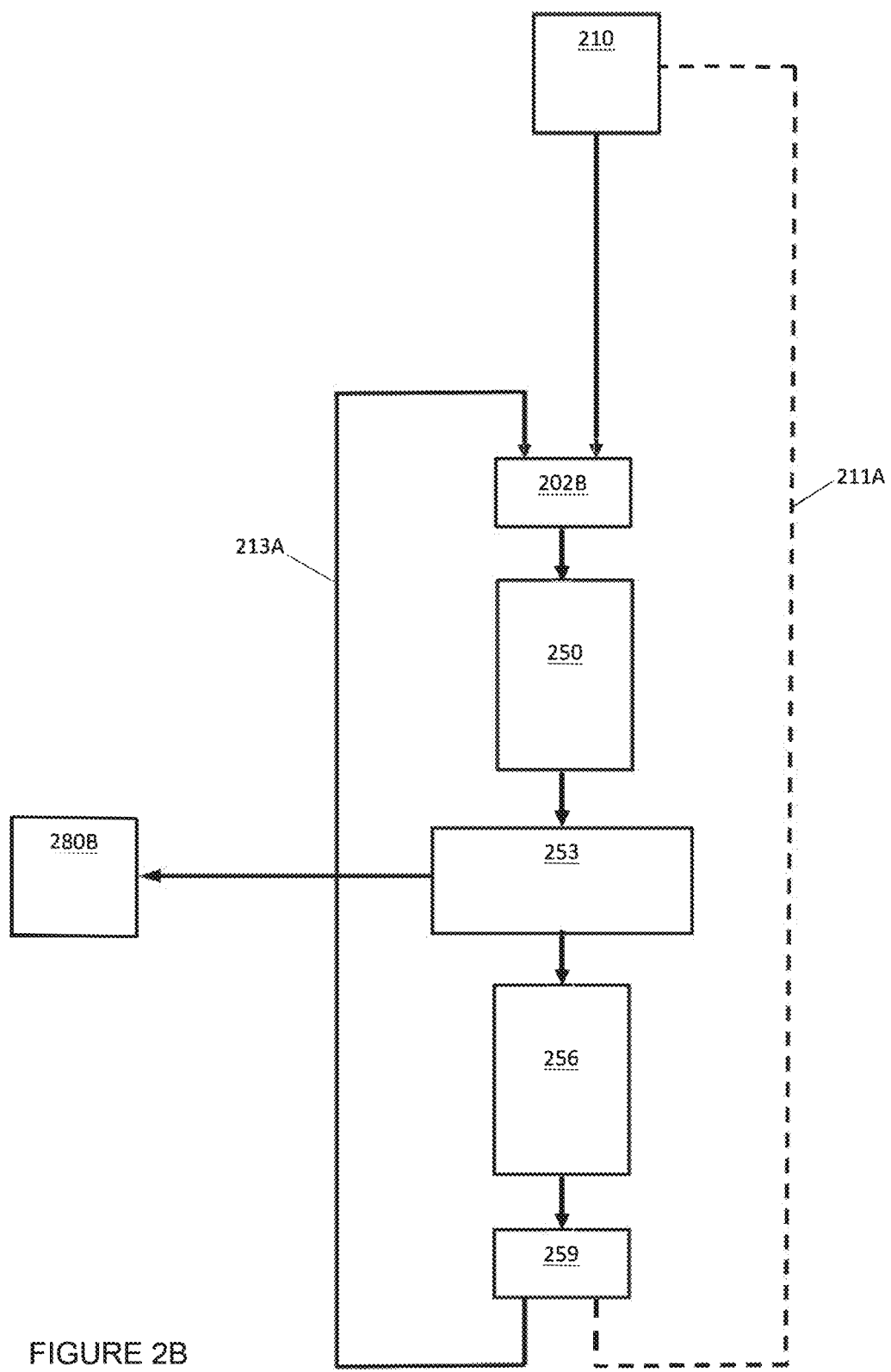
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
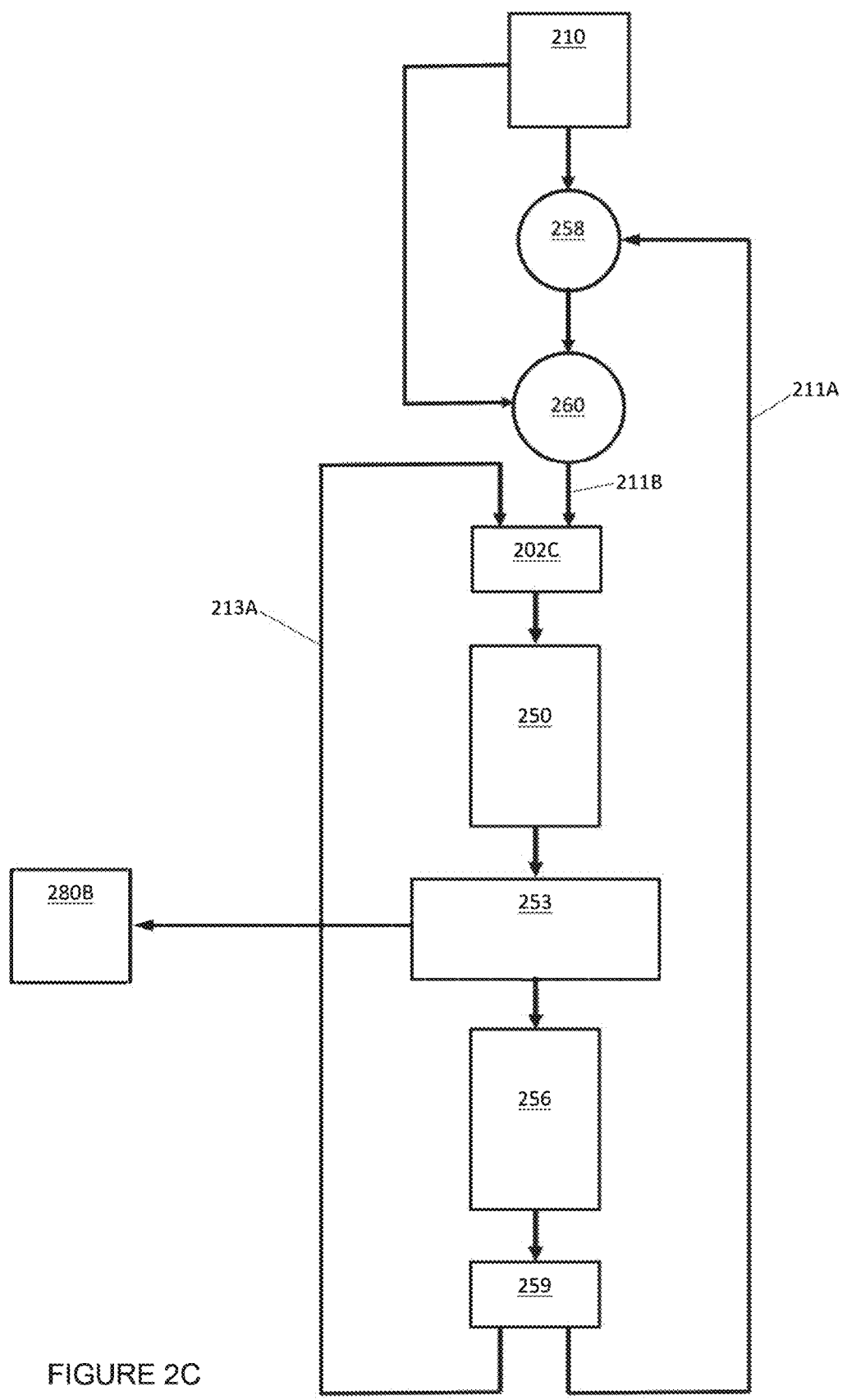
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number. The embodiment of FIG. 2C is the same as that of FIG. 2A and FIG. 2B in all other respects. It may be said that the phase-only hologram ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering.

Again, It is known in the field of computer-generated hologram how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
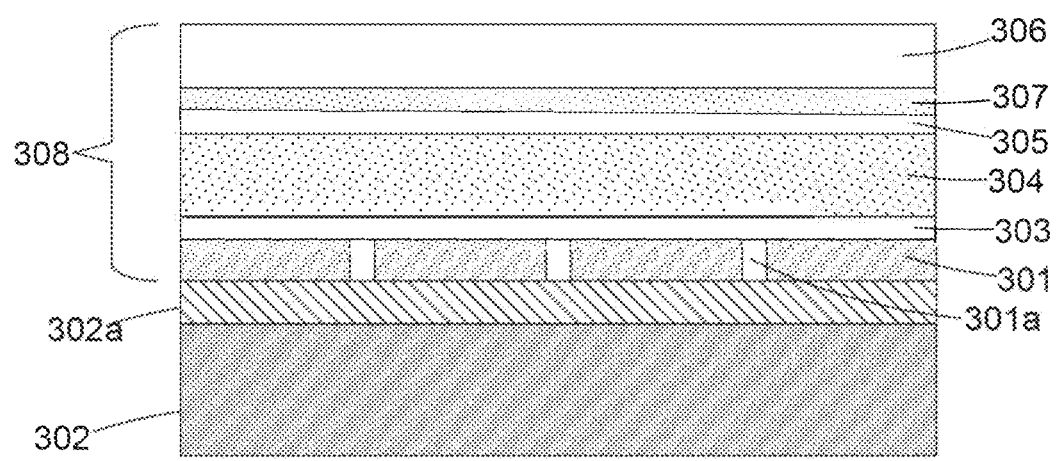
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the liquid crystal layer 304 and a planar transparent layer 306, e.g. of glass, is disposed on the second alignment layer 305. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Holographic Projector

Figure 4:
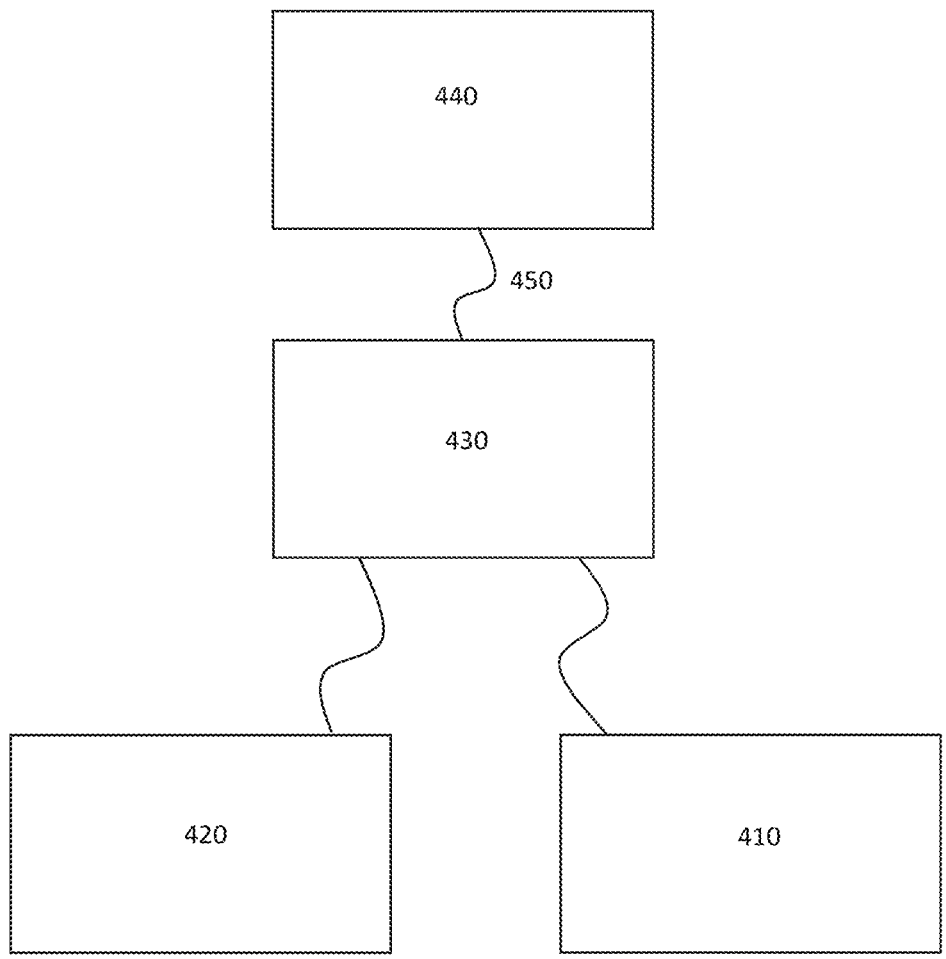
FIG. 4 shows a schematic of a holographic projector in accordance with embodiments.

One embodiment of the present holographic projector is described with reference to FIG. 4. A spatial light modulator, or SLM, 410 is arranged to be illuminated with an input beam from a light source 420. An assembly 430 is arranged to move at least one of the input beam and the spatial light modulator relative to the other. A controller 440 is arranged to drive the assembly. In some embodiments, the controller 440 is electrically connected 450 to the assembly 430 to drive the assembly. In some embodiments, the assembly 430 is electrically connected to one or both of the SLM 410 and light source 420 in order to produce the relative movement. Additionally or alternatively, the assembly 430 is arranged to produce the relative movement of the input beam and the SLM without moving the SLM 410 or light source 420; in this embodiment, the assembly need not be electrically connected to the SLM 410 or light source 420.

An embodiment of the present holographic projector is described with reference to FIG. 5. The spatial light modulator, or SLM, 510 is illuminated with an input beam 500 from the light source. The assembly is arranged to move at least one of the input beam and the spatial light modulator relative to the other. In particular, the assembly is arranged to move at least one of the input beam 500 and the SLM 510 so that the light is incident on the spatial light modulator 510 at a plurality of different positions. In the illustrated arrangement, the light spot formed by the input beam 500 in the plane of the SLM 510 is substantially circular. Thus, the area illuminated by the input beam 500 is substantially circular. As the skilled person will appreciate, the shape and size of the area illuminated corresponds to the shape and size of the cross section through the input beam 500 in the plane of the SLM 510. Thus, the light spot may be elliptical when the angle of incidence of the input beam is off-normal (i.e. with tilt). Although not illustrated in FIG. 5, the intensity (and phase?) profile of the light spot of the input beam 500 is generally non-uniform. Typically, the spatial intensity profile is such that the intensity (brightness) is higher at the centre that the periphery of a light beam. For example, the ideal spatial intensity profile of a laser beam has a gaussian distribution in a plane orthogonal to its axis. The phase profile of the light may also vary across a light beam.

As shown in FIGS. 5A to 5E, in this embodiment the SLM 510 remains stationary and the position of the input beam 500 is moved with respect to the SLM 510 by the assembly by any suitable means. The light source is arranged such that the input beam 500 illuminating the SLM illuminates the entire surface of the SLM, as well as the area surrounding the SLM. This is termed overfill. Such overfill ensures that the SLM is always illuminated, regardless of the exact position of the input beam 500 during the movement by the assembly. This overfill can also be advantageous since the larger cross section of the input beam applied to the SLM 510 can facilitate greater variations in the illuminating light pattern between each successive image. As the portion or cross-section of the input beam which illuminates the SLM is varied as a result of the relative movement, non-uniformities in the light beam are effectively smoothed out resulting in improvements to the holographic reconstruction.

Figure 5A:
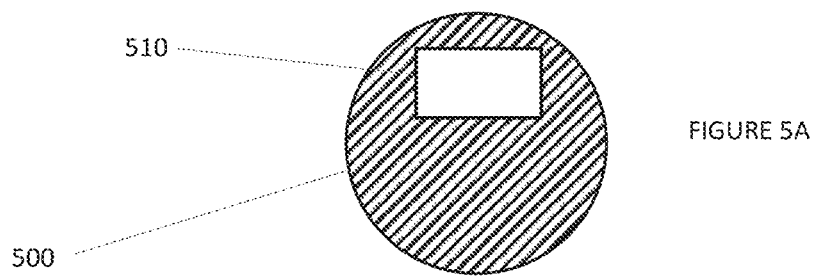
FIGS. 5A-5E shows a moving input beam and overfilled SLM in accordance with embodiments.
Figure 5B:
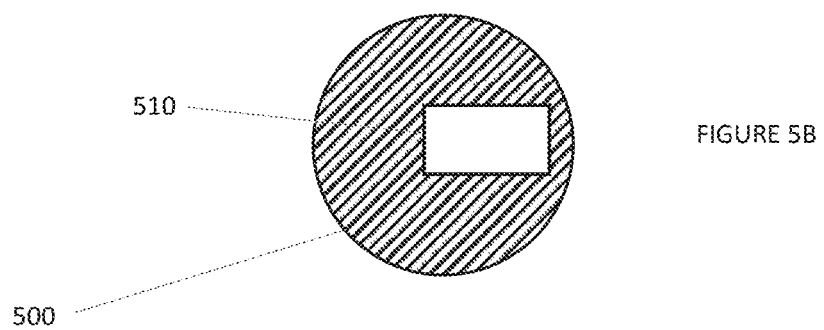
Figure 5C:
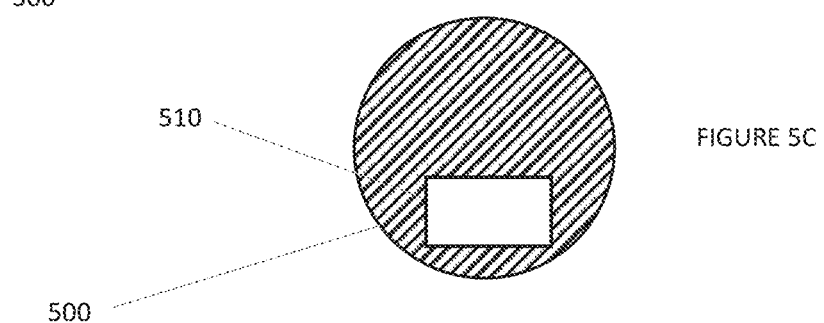
Figure 5D:
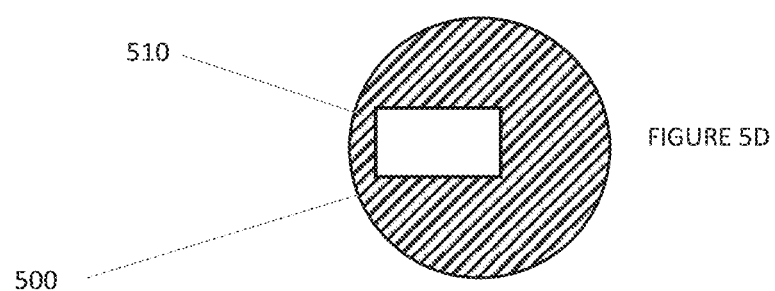
Figure 5E:
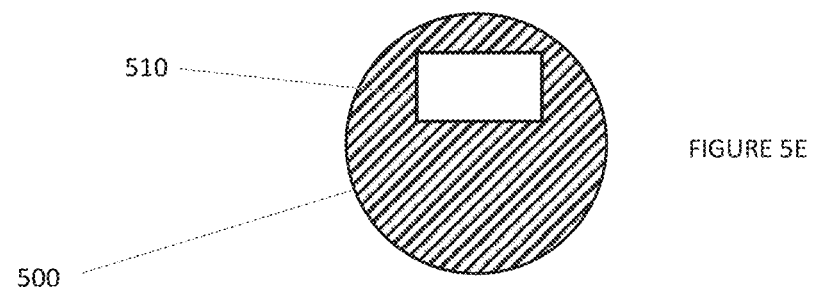

Each of FIGS. 5A to 5E represents the position of the input beam 500 at a particular point in time. In particular, each of FIGS. 5A to 5E shows the position of the light spot formed by the input beam 500 relative to the SLM 510 (in the plane of the SLM 510) at a different point in time. FIG. 5A shows a first position of the input beam 500 incident on the SLM 510 a first point in time, FIG. 5B shows a second position of the input beam 500 incident on the SLM 510 at a second point in time, FIG. 5C shows a third position of the input beam 500 incident on the SLM 500 at a third point in time, FIG. 5D shows a fourth position of the input beam 500 incident on the SLM 510 at a first fourth in time and FIG. 5E shows a fifth position of the input beam 500 incident on the SLM 510 at a fifth point in time. In some embodiments, the input beam 500 is moved continuously between the different positions, i.e. between the first position of the input beam 500 in FIG. 5A and the second position of the input beam 500 in FIG. 5B and so on. In other embodiments, the input beam 500 is moved periodically between the different positions, i.e. the first position of the input beam 500 shown in FIG. 5A is held for a predetermined period of time, and then the assembly acts to switch or move the input beam 500 to the second position shown in FIG. 5B and so on. Optionally, between 15 to 25 positions of the input beam relative to the SLM 510 are provided in a time period within the integration time of the human eye. Optionally, 20 positions of the input beam 500 are provided within the integration time of the human eye. The integration time of the human eye is typically 15-300 ms, more typically 30-100 ms. When the SLM displays a hologram representative of a frame of a video, there are preferably 15 to 25 different positions, more preferably 20 positions, of the input beam adopted within the time of a single frame (i.e. within $1/24$ second for a 24 frame per second video). In some embodiments, the number of different positions required decreases with the distance between successive positions.

In some embodiments, such as those described above with reference to FIG. 5, the size (number of pixels in each direction) of the hologram to be reconstructed is equal to the size of the spatial light modulator so that the hologram fills the spatial light modulator. That is, the hologram uses all the pixels of the spatial light modulator. In other embodiments, such as that described below with reference to FIGS. 6 and 7, the size of the hologram to be reconstructed, or input hologram, is less than the size of the spatial light modulator. Therefore, to fill the SLM, part of the input hologram (that is, a continuous subset of the pixels of the hologram) is repeated in the unused pixels. This technique may be referred to as tiling, wherein the surface area of the spatial light modulator is divided up into a number of tiles, each of which represents at least a subset of the hologram. Each tile is therefore of a smaller size than the spatial light modulator. Thus, in embodiments in which the SLM comprises a plurality of light modulating elements or pixels, tiling may be used when the number of pixels of the hologram to be reconstructed, or input hologram, is less than the number of pixels of the SLM. As previously noted, each tile comprises a continuous set or subset of pixels of the input hologram.

It is usually desirable to have small image pixels. It is also usual in display technology to want the maximum number of image pixels possible. However, degradation of image quality can occur if the density of image pixels in the holographic replay field is too high. There is an optimum number of image pixels or optimum range for the number of image pixels for a given size of holographic replay field. It has been found that tiling an input hologram onto an output hologram can reduce such image degradation and increase image quality by allowing the size and number of image spots to be optimised. Specifically, some embodiments implement the technique of tiling to optimise the size of the image pixels whilst maximising the amount of signal content going into the holographic reconstruction. Moving the input beam around on a tiled pattern improves the uniformity of the holographic light spots in the replay field due to averaging the phase and illumination distribution of the input beam.

In an embodiment described with reference to FIG. 6, a different arrangement to that described with reference to FIG. 5 is provided; namely, an arrangement is shown in which the SLM is underfilled rather than overfilled. In FIGS. 6A to 6E, a light spot of the input beam 600 is applied to the SLM to illuminate the SLM. The size of the area illuminated by the input beam 600 is less than the total size of the SLM 610. As such, not all of the SLM 610 is illuminated. In these embodiments, an input hologram comprising fewer pixels than the spatial light modulator is used. The hologram displayed on the SLM comprises a series of complete tiles 605 of the input hologram; in other words, each tile 605 is wholly representative of the input hologram. This embodiment also helps mitigate the consequences of any non-uniformities in the SLM device.

Figure 6A:
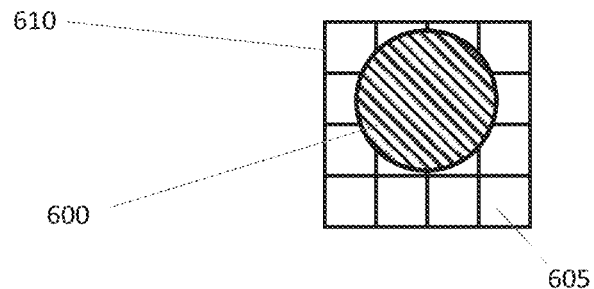
FIGS. 6A-6E shows a moving input beam and an underfilled SLM in accordance with embodiments.
Figure 6B:
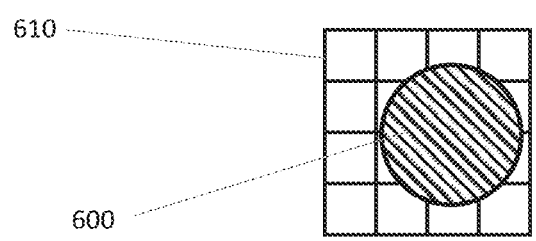
Figure 6C:
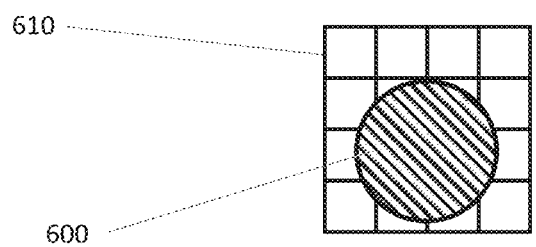
Figure 6D:
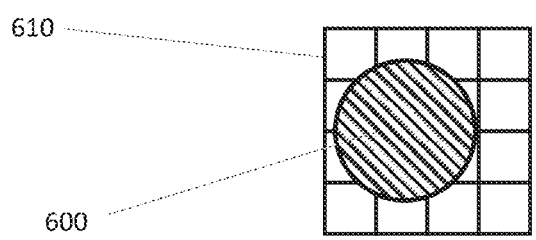
Figure 6E:
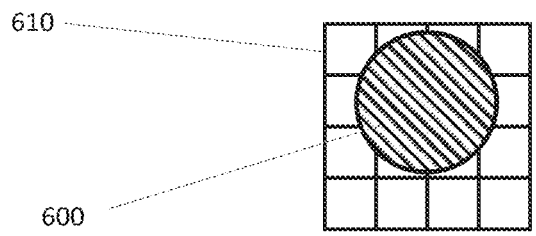

In particular, an assembly is arranged to move at least one of the input beam 600 and SLM 610 relative to the other. FIGS. 6A to 6E represent the position of the input beam 600 at particular points in time. In particular, each of FIGS. 6A to 6E shows the position of the light spot formed by the input beam 600 relative to the SLM 610 (in the plane of the SLM 610) at a different point in time. FIG. 6A shows a first position of the input beam 600 incident on the SLM 600 a first point in time, FIG. 6B shows a second position of the input beam 600 incident on the SLM 610 at a second point in time, FIG. 6C shows a third position of the input beam 600 incident on the SLM 610 at a third point in time, FIG. 6D shows a fourth position of the input beam 500 incident on the SLM 610 at a first fourth in time and FIG. 6E shows a fifth position of the input beam 600 incident on the SLM 610 at a fifth point in time. In some embodiments, the input beam 600 is moved continuously between the different positions, i.e. between the first position of the input beam 600 in FIG. 6A and the second position of the input beam 600 in FIG. 6B and so on. In other embodiments, the input beam 600 is moved periodically between the different positions, i.e. the input beam 600 is held for a predetermined period of time in each position, such as the first position shown in FIG. 6A, and then moved to the next position of the input beam 600, such as the second position shown in FIG. 6B and so on. In this embodiment, the position of the input beam 600 is moved with respect to the SLM 610 by the assembly by any suitable means. In an alternative embodiment, the SLM 610 is moved with respect to the input beam by any suitable means, or both the input beam and the SLM are moved relative the other.

FIG. 6 shows an input beam 600 with a cross sectional area smaller than the area of the SLM 610. The input beam 600 can have a larger cross sectional area relative to the area of the SLM than that illustrated, or a smaller cross sectional area relative to the area of the SLM than that illustrated. FIG. 6 is provided for the purposes of illustration only. Similarly, 16 whole or complete tiles 605 are shown on the SLM in FIG. 6 for the purposes of illustration only; there may be more or less complete tiles 605 represented or displayed on the SLM. It can be understood that in some embodiments the holographic pattern written to the spatial light modulator comprises at least one whole tile (that is, the whole tile 605 representative of the input hologram) and at least one fraction of a tile (that is, a continuous subset of pixels of the input hologram, or a subset of the whole tile 605).

The light source is arranged such that the input beam 600 illuminating the SLM illuminates only a region of the surface of the SLM 610, and does not illuminate the area surrounding the SLM 610. This is termed underfill. In some embodiments, such as the illustrated embodiment, this underfill is combined with tiling, in order that the resulting holographic representation formed from the spatially modulated input beam is representative of the input hologram. The light source is further preferably arranged such that a complete tile 605 displayed on the SLM 610 is always illuminated, regardless of the position of the input beam 600 on the SLM during the movement by the assembly. In the illustrated embodiment, the cross sectional area of the input beam 600 (in the plane of SLM 610) is equal to or greater than the area of 4 complete tiles 605 (assuming all tiles 605 are of equal size). This underfill, combined with tiling, advantageously improves the image quality.

Figure 7:
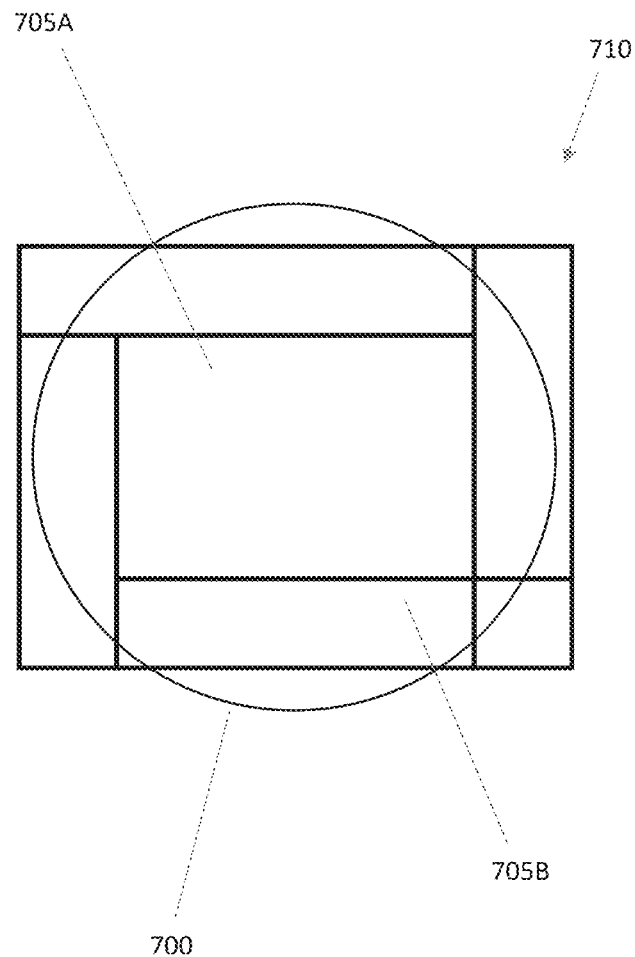
FIG. 7 shows another example of a moving input beam and an underfilled SLM.

An arrangement similar to that described above with reference to FIG. 6 is described with reference to FIG. 7. In this embodiment, the SLM is arranged to display a complete, or whole, tile 705a and at least one part tile 705b. The at least one part tile 705b is a continuous subset of the pixels of the hologram represented by the whole tile 705a. The hologram displayed on the SLM can be any suitable combination of at least one whole tile 705a and at least one part tile 705b. Preferably, one whole, or complete, tile 705a is always illuminated by the input beam 700. This ensures that the holographic representation formed by the spatially modulated input beam is representative of the hologram of the whole tile 705a. In this embodiment, the displacement or movement of the input beam 700 is necessarily small relative to the size of the SLM in order to maintain illumination of the whole tile 705a. For example, the movement may be in the order of a few pixels of the SLM, or it may be 5% to 25% of the width of the whole tile 705a (depending on the size of the input beam 700 relative to the size of the whole tile 705a). These values are merely examples, and the limits on the movement of the light 700 may be determined by routine experimentation and measurement/observation.

The above described embodiments combine tiling with a moving light beam that underfills the SLM. As the skilled person will appreciate, tiling may be used in embodiments providing a moving light beam that overfills the SLM. In such embodiments, since the whole of the SLM is illuminated by the moving light beam at all times, any suitable tiling scheme of the input hologram to be reconstructed can be used to form the output hologram for display on the SLM.

In embodiments of the above described projector, the assembly is arranged to move the input beam relative to the SLM by any suitable means. For example, the input beam (a laser beam or other input light) can be moved relative to the spatial light modulator, or vice versa, by a moving mirror, mirror mount, mirror assembly, laser, laser mount, collimating lens, other optic, spatial light modulator, or spatial light modulator fixture. Moving includes rotating, translating or tilting. Such movement may be achieved, for example, with an actuator, a vibrating element, or an oscillating element. The assembly is driven by a controller. In some embodiments, the input beam is not moved by way of mirrors or other optical elements, but rather the light source itself is physically moved. Additionally or alternatively, the SLM is physically moved. For example, the light source or SLM may be rotated, tilted or translated with an actuator or an oscillating element.

Figure 8:
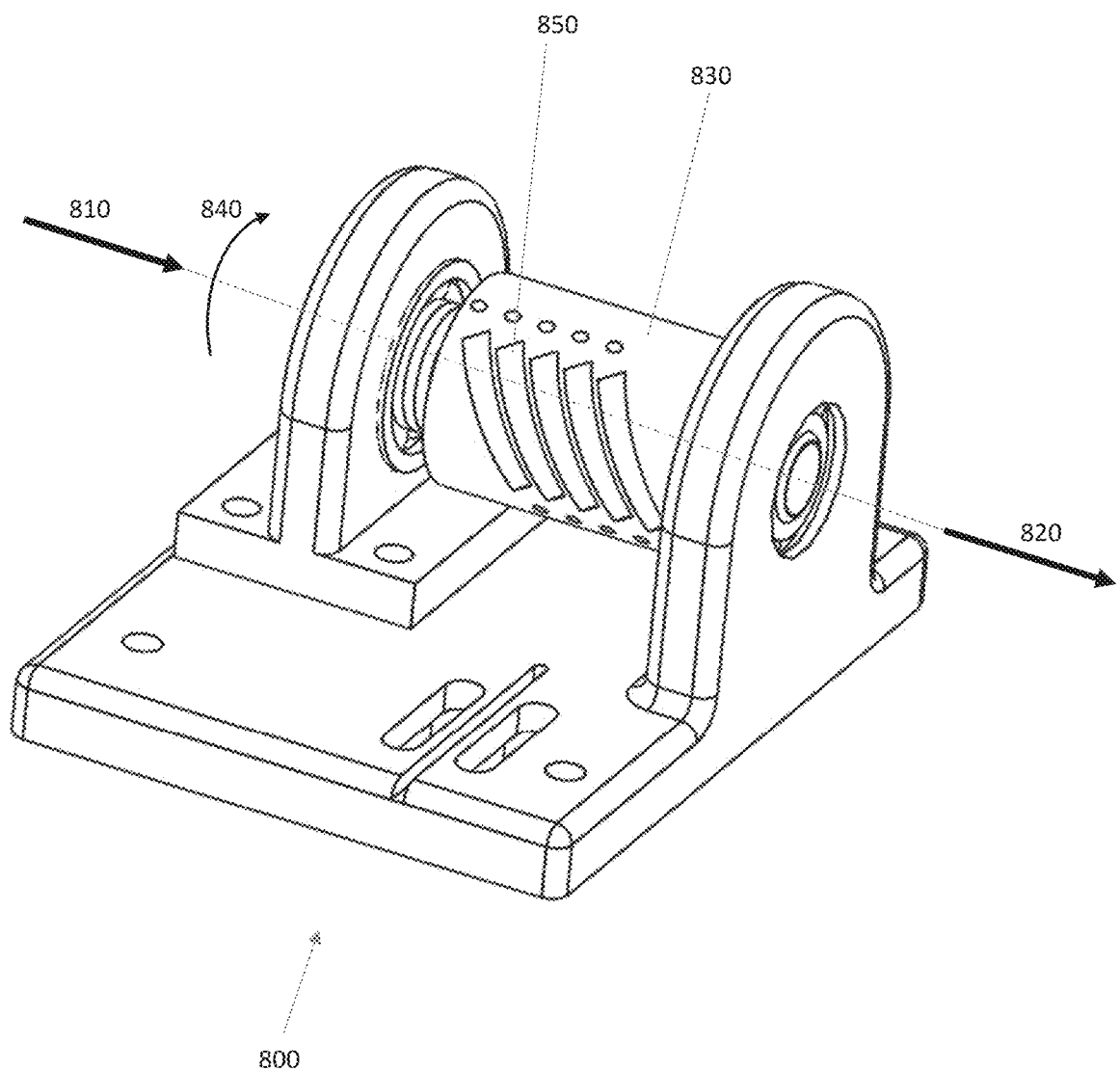
FIG. 8 shows an assembly in accordance with embodiments.

One example of the assembly is described with reference to FIGS. 8 and 9. FIG. 8 illustrates an example assembly 800 driven by a controller which is arranged to rotate one or more parallel-face plates (typically referred to as parallel-face windows or parallel-face optical windows) around an axis of rotation. The assembly 800 comprises a plurality of slots 850 to hold one or more parallel-face plates, the one or more slots 850 being arranged along a housing 830. The assembly may comprise only one slot 850 of any suitable thickness to hold the desired thickness of parallel-face plate; multiple slots are shown as an example only. When the housing 830 comprises multiple slots 850, multiple parallel-face plates may be inserted into the housing 830 to change the effective thickness of the optical element.

The input beam 810 from the light source travels along an optical path or axis, shown by the line in FIG. 8 between the arrows showing the direction of the light beam 810, 820 (a dashed-dotted line is shown inside the assembly 800). The assembly 800 is positioned central to this optical axis, such that a parallel-face plate inserted into one or more of the slots 850 is placed into the input beam 810. The input beam 810 is preferably collimated light. As can be seen from FIG. 8, each of the one or more slots 850 is inclined with respect to the optical axis. As such, a parallel-faced plate inserted into a slot 850 will be inclined with respect to the collimated light beam of the input beam 810.

The assembly 800 comprises a base and two arms which extend from the base to support housing 830. The arms each comprise a hole containing a bushing—the housing 830 is supported in the holes of the arms of the assembly 800. The bushings facilitate rotation of the housing in direction of rotation 840. Bearings may alternatively be used to facilitate rotation. A controller drives the assembly 800. The assembly 800 may be driven by a motor (which can be any commercially available DC brushless motor, or any other form of suitable motor) connected to the housing 830 by a belt or other gearing mechanism, where the motor is controlled by the controller. Rotation of the housing 830 rotates the one (or possibly more) inclined parallel-face plate inserted into a slot 850 of the housing 830. The axis of rotation of the parallel-face plate is parallel to the optical axis. Optionally, the axis of rotation of the parallel-face plate is collinear with the optical axis. Preferably, in this embodiment, the axis of rotation of the parallel-face plate is the optical axis.

The parallel-face plate acts as a decentering element. That is, it moves the light off-axis owing to refraction of the light passing through the parallel-face plate. As the parallel-face plate rotates with the housing 830 in direction 840, the light is rotated about the axis of rotation. When the SLM is underfilled, the position of the input beam incident on the SLM is also rotated. Accordingly, the position of the input beam illuminating the SLM is continually changing and randomness is introduced to the holographic reconstruction, which reduces speckle as described above. When the SLM is overfilled, the portion of the input beam illuminating the SLM is continually changing, and the non-uniformities in the input beam introduce randomness into the holographic reconstruction. In FIG. 8, there is no parallel-face plate present and the input beam 810 has the same optical path as the beam 820 output from the assembly 800.

Figure 9A:
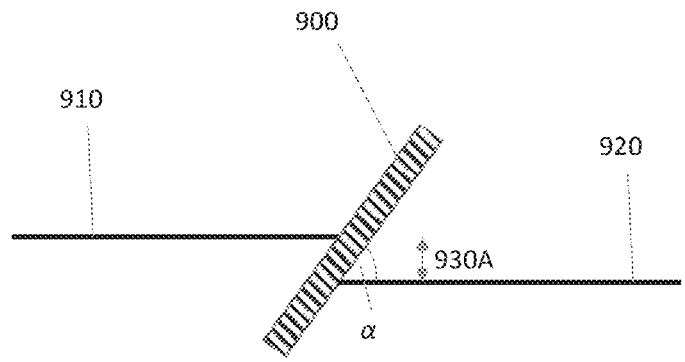
FIGS. 9A-9C shows an optical element in accordance with embodiments.
Figure 9B:
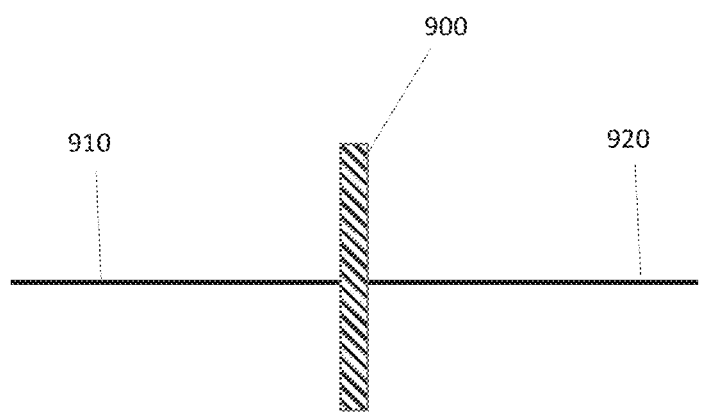
Figure 9C:
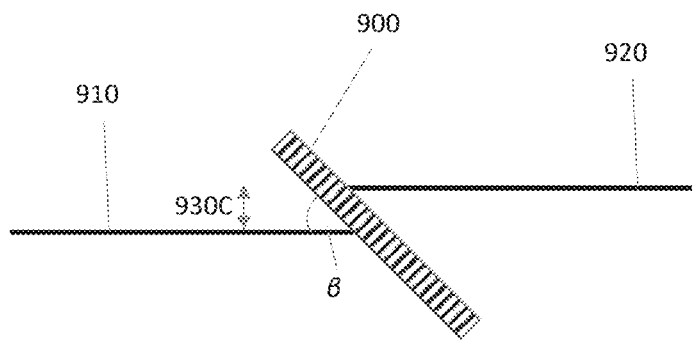

It is essential that the two faces of the parallel-face plate are parallel in order for the input beam 810 and the beam 820 output from the assembly to be parallel (but spatially-offset). This effect is illustrated in FIGS. 9A to 9C. However, in alternative embodiments a different optical element arrangement can be employed in which the faces of a plate are not parallel, in order to tilt the output beam 820 relative to the input beam 810. Alternatively, an optical element other than an optical plate can be employed with assembly 800, or with a different assembly arrangement.

FIGS. 9A to 9C show a cross-section of the displacement 930 of the input beam 910 which is achieved with the controller-drive assembly 800 shown in FIG. 8 and a parallel-face plate 900. As can be seen from the three different depictions in FIGS. 9A to 9C, as the angle of the parallel-face plate 900 changes, the displacement 930 of the output beam 920 relative to the input beam 910 changes. When the plate 900 is not inclined (FIG. 9B), there is no change in the position of the output beam 920 relative to the input beam 910. However, it can be seen that the degree of tilt of the plate 900 (angle $\alpha$, $\beta$ of the parallel-face plate 900) relative to the input beam 910 changes both the extent and the direction of displacement 930A, 930C of the output beam 920.

When $\alpha=\beta$, FIGS. 9A and 9C illustrate the change in position of the output beam 920 as the assembly is driven to rotate the parallel-face plate 180 degrees around the axis of rotation. In this embodiment, the axis of rotation is the optical axis in FIG. 8, but alternatively the axis of rotation could be an axis parallel to the optical axis. It can be seen that the output beam 920 rotates around the optical axis of the input beam 910 as the assembly 830 rotates.

There are many, inter-related, variables, including the nature of the image, the viewer's pupil size, ambient light conditions etc., which determine how effective the device of FIG. 8 is at de-speckling. In practice, the optimum parameters may be determined by experimentation and measurement/observation. However, it has been found that the following parameters applied to the assembly of FIG. 8 improve the appearance of speckle:
  Absolute angle ($\alpha$, $\beta$) of parallel-face plate relative to the optical axis=30-60 degree, optionally 40-55 degrees, further optionally 45+/−2 degree;
  Thickness of plate=0.5-40 mm, optionally 2-20 mm, further optionally 4-10 mm;
  Diameter of plate=5-40 mm, optionally 10-35 mm, further optionally 25+/−5 mm;
  Speed of rotation=100-10,000 rpm, optionally 200-5,000 rpm.

Whilst the assembly of FIGS. 8 and 9 is arranged to move the input beam relative to the SLM by mechanical means, in particular by rotating one or more parallel-face plates, it is also possible to move the input beam relative to the SLM by electrical means. One example of an assembly comprising an electrically controlled beam deflector, arranged to move the input beam relative to the SLM, is described below with reference to FIGS. 10 to 13.

Figure 10:
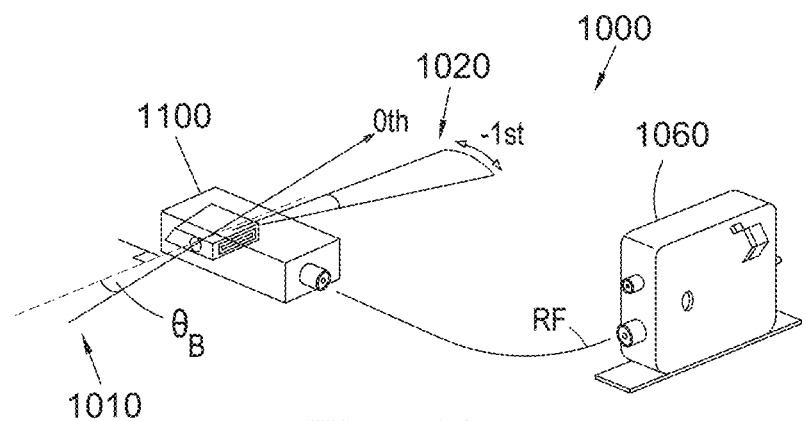
FIG. 10 shows an alternative assembly in accordance with other embodiments.
Figure 11:
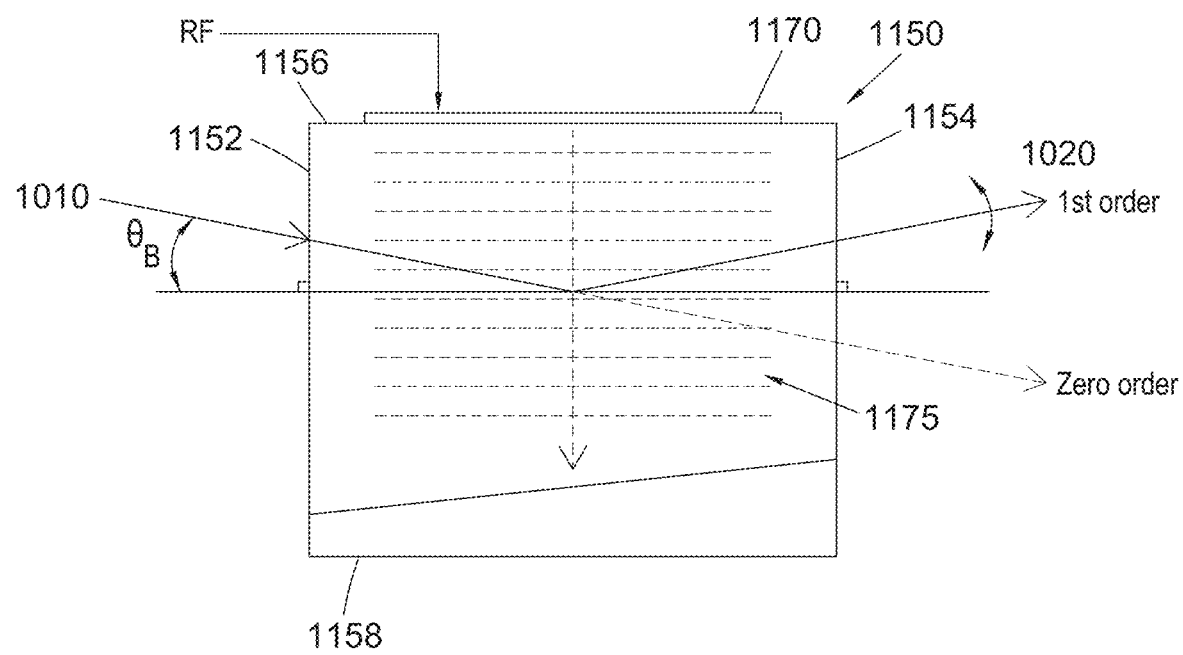
FIG. 11 shows the arrangement for the acousto-optic deflector of the assembly of FIG. 10.

FIG. 10 schematically illustrates an example assembly 1000 comprising an acousto-optic deflector (AOD) 1100 and an RF signal driver 1060, and FIG. 11 shows the arrangement of the AOD 1100 in more detail. The AOD 1100 is positioned in the optical path or axis of the input beam 1010 from the light source, and is arranged to receive a radio frequency (RF) drive signal from an RF signal driver 1060. FIG. 10 shows the optical path of the light beam by solid lines. The input beam 1010 is incident on an optical element 1050, which is housed within the AOD 1100, at an input angle relative to the normal of the front face thereof (corresponding to a first optical path of the light beam). The output beam 1020 is transmitted out of the optical element 1050 at one or a range of output angles relative to the normal of the rear face thereof in a first diffraction order (corresponding to a second optical path of the light beam). As described further below, when the input angle of the input beam 1010 corresponds to the Bragg angle, the output beam 1020 may be mainly diffracted in the first diffraction order at an output angle dependent on the frequency of the RF drive signal applied to the AOD 1100. FIG. 10 also show the optical path of the (unused) zeroth diffraction order transmitted out of the AOD 1100, which has the same direction as the first optical path of the input beam 1010. The output beam 1020 in the first diffraction order is deflected in a different direction, and thus at a different angle, to the input beam 1010. Accordingly, by adopting the illustrated Bragg angle configuration and changing the frequency of the RF drive signal, it is possible to change the output angle of the output beam 1020 and thus the direction of the second optical path of the output beam 1120. The output beam 1020 forms the input beam that is incident on the SLM. Thus, in accordance with the present disclosure, the assembly 1000 can be used to move the output beam 1020 relative to the SLM so that it is incident at a plurality of different positions on the SLM, by changing the frequency of the RF drive signal to AOD 1100 from RF signal driver 1060. FIG. 10 shows how AOD 1100 can move the light beam through a range of angles (as shown by double-headed arrow) to move or scan the output beam 1020 across the SLM in one dimension. As the skilled person will appreciate, an AOD 1100 that additionally provides beam displacement through a range of angles in a second dimension is possible in order to provide two-dimensional scanning of the output beam 1020 across the SLM, as described above with reference to FIGS. 5, 6 and 7. The AOD 1100 is shown in more detail in FIG. 11.

Referring to FIG. 11, the AOD 1100 includes an optical element 1150 comprising a transparent optical medium that forms a light propagation medium for the light beam 1010, 1020. In particular the optical element 1150 may comprise an optically transparent material crystalline material such quartz or crystal (e.g. tellurium dioxide) or a non-crystalline materials such as glass, Optical element 1150 comprises a first side 1152, a second side 1154 opposite the first side 1152, a third side 1156 orthogonal to the first side 1152 and a fourth side 1158 opposite the third side 1156. The input beam 1010 is incident on the first side 1152 and the output beam 1020 is transmitted from the second side 1154. For ease of illustration, the beam deflection at the interface between the optical element 1150 and the ambient at the first and second sides 1152, 1154, respectively, is not show in FIG. 11. AOD 1100 further includes a piezo-electric transducer 1170 (mechanically) attached to the third side 1156 of the optic 1150. Piezo-electric transducer 1170 is driven by an RF signal (from RF signal driver 1060 shown in FIG. 10) having a variable oscillating frequency f. When an RF signal is applied, the transducer 1170 generates acoustic (vibrational) waves 1175 according to the frequency f, as shown by dashed lines in FIG. 11. The acoustic waves 1175 propagate through the light propagating medium of the optical element 1050 from the third side 1156 to the fourth side 1158, and thus across the optical path of the light beam 1010, 1020.

As known in the art, AODs operate by virtue of a change in the refractive index of the optical material due to the photo-elastic effect of the acoustic waves generated by the piezoelectric transducer. It may be said that the light beam "interacts with" or is "diffracted off" the acoustic wavefront generated by the piezo-electric transducer according to the frequency f of the RF drive signal. Typically, the angle of incidence of the light beam 6 and the RF frequency f are chosen so that the acoustic wavelength of the acoustic waves introduces a preferential weighting for certain diffraction orders and suppresses others. In particular, the Bragg regime may be used as shown in FIG. 11, in which the input beam is incident at the Bragg angle $\theta_B$ and the RF frequency f is in the range of hundreds of MHz to GHz. With the Bragg regime, the dominant diffraction orders are the zero and a single first diffraction order. Depending on the RF power, as much as 90% of the incident beam can be directed to the single first order, to provide a distinct diffracted output beam corresponding to an incident input beam. In embodiments, the characteristics of the RF drive signal are chosen so that at least 50%, optionally at least 75%, of the incident light is diffracted to the output beam. Accordingly, modulating the RF drive frequency changes the output angle of the diffracted beam, and thus changes the deflection of the output beam. In this way, the output beam can be moved through a range of angles in a single dimension under the control of an RF drive signal, as shown in FIG. 10.

Figure 12:
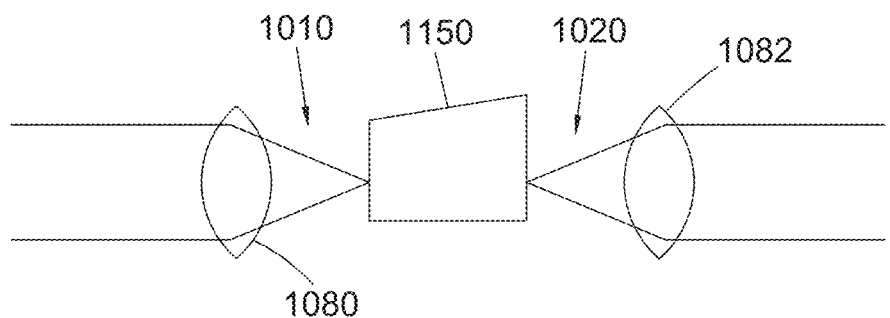
FIG. 12 is a schematic showing an arrangement for implementing the assembly of FIGS. 10 and 11.
Figure 13:
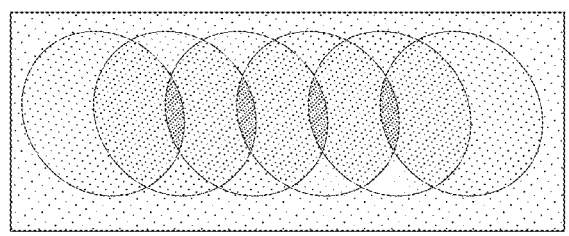
FIG. 13 shows a moving input beam in accordance with embodiments.

Referring to FIG. 12, in some embodiments, the input beam 1010 is a collimated beam of coherent light. In particular, input beam 1010 from a coherent light source (e.g. laser) is focused by a first collimating lens 1080 to be incident on the optical element 1050 of the AOD 1100 at a first angle (e.g. Bragg angle). It may be said that collimated light of the input beam 1010 is focused to an appropriate point diameter for the AOD 1110 comprising optical element 1050. The output beam 1020, which corresponds to the light diffracted by optical element 1050 to the first diffraction order, is transmitted from an AOD 1100 at a second angle, which is different from the first angle. The first and second angles are measured relative to the normal of the respective surface of the optical element 1050. The output beam 1020 has an angular deviation and so is collimated by a second collimating lens 1082 to provide a collimated beam of coherent light to illuminate the SLM. FIG. 13 shows an example of moving the output beam 1020 from the AOD 1100 to a plurality of different positions on the SLM. In particular, the output beam 1020 is moved or scanned along a line (i.e. in one dimension) by changing the angle of the diffraction beam (e.g. in the first diffraction order), by varying the frequency of the RF drive signal to the AOD 1100, as described herein. As described herein, light incident on the SLM at each beam position will result in the generation of an independent speckle pattern in the replay field. Thus, by scanning the output beam 1020 through a range of angles as shown in FIG. 13, the different speckle patterns formed in the replay field can be averaged out by the human eye. Whilst, FIG. 13 shows a plurality of overlapping positions of the area illuminated by the light beam on the SLM, a plurality of spatially separated positions may be used and/or combinations of overlapping and non-overlapping positions. In addition, as described above, two-dimensional scanning using one or more AODs for beam displacement in two dimensions is possible.

Some embodiments may include the alternative assembly 1100 of FIGS. 10 and 11 to move the input beam relative to the spatial light modulator, in particular so that the input beam is incident at a plurality of different positions on the spatial light modulator at different points in time. By continually (i.e. continuously or periodically) moving the input beam relative to the SLM, the above described effect of averaging the phase and brightness of the illuminating beam is achieved so as to improve the shape, size, uniformity and brightness profile of the light spots of the holographic reconstruction as described above. In addition, continually moving the input beam across the SLM introduces a randomness in the illumination, which can average out the speckle patterns as described above. Thus, the quality of the holographic reconstruction can be improved. In addition, the alternative assembly 1100 does not require mechanically moving parts and can be controlled accurately using electrical signals and appropriate AOD calibration techniques, which are well known in the art.

Additional Features

Embodiments refer to an optically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser. In some embodiments, the light receiving surface is a screen or a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is in colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for $\frac{1}{75}$th of a second, then the green laser would be fired for $\frac{1}{75}$th of a second, and finally the blue laser would be fired for $\frac{1}{75}$th of a second. The next frame is then produced, starting with the red laser, and so on.

An advantage of FSC method is that the whole SLM is used for each colour. This means that the quality of the three colour images produced will not be compromised because all pixels on the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496,108 which is hereby incorporated in its entirety by reference.

Examples describe illuminating the SLM with visible light but the skilled person will understand that the light sources and SLM may equally be used to direct infrared or ultraviolet light, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some embodiments describe 2D holographic reconstructions by way of example only. In other embodiments, the holographic reconstruction is a 3D holographic reconstruction. That is, in some embodiments, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
 a spatial light modulator (SLM) arranged to display a hologram comprising two or more tiles of an input hologram representative of an image to be reconstructed, each tile of the displayed hologram comprising at least a subset of pixels representative of a part of the input hologram, wherein at least one tile is a whole tile comprising a complete set of pixels representative of a whole of the input hologram;
 a light source arranged to illuminate at least one region of the spatial light modulator with an input beam such that the input beam is spatially modulated by the spatial light modulator in accordance with the hologram to form a holographic reconstruction for projection by the holographic projector; and
 an assembly arranged to continually move at least one of the input beam and the spatial light modulator relative to the other, while the holographic reconstruction remains formed, so that the input beam is incident at a plurality of different positions on the spatial light modulator at different points in time.

2. The holographic projector of claim 1, wherein the assembly comprises an optical element arranged to receive the input beam on a first optical path and output the input beam on a second optical path.

3. The holographic projector of claim 2, wherein the first optical path has a first angle relative to the normal of the optical element and the second optical path has a second angle relative to the normal of the optical element, wherein the first angle is different to the second angle.

4. The holographic projector of claim 3, wherein the assembly is arranged to change the second angle of the second optical path by diffraction (or deflection) of the input light beam.

5. The holographic projector of claim 3, wherein the assembly comprises an acousto-optic deflector (AOD) and an RE drive signal generator, optionally wherein the assembly is arranged to change the second angle of the second optical path by changing the frequency of the RE drive signal.

6. The holographic projector of claim 5, wherein the AOD comprises the optical element, and wherein the input beam is incident on the optical element at a first angle and is transmitted from the optical element at a second angle corresponding to the first diffraction order.

7. The holographic projector of claim 6, wherein one or more of:
the first angle is substantially the Bragg angle;
the frequency of the RE drive signal is determined to preferentially weight at least one diffraction order, and
the power of the RE drive signal is determined so that at least 50% of the light of the input beam is diffracted to a single diffraction order.

8. The holographic projector of claim 2, wherein the second optical path is substantially parallel to, but spatially off-set from, the first optical path.

9. The holographic projector of claim 8, wherein the optical element is a parallel-face plate inclined with respect to the first optical axis, optionally wherein the assembly is arranged to rotate the optical element in order to rotate the second optical path, further optionally wherein the assembly is arranged to rotate the optical element around an axis parallel to the first optical axis, optionally, wherein the axis parallel to the first optical axis is collinear with the first optical axis.

10. The holographic projector of claim 1 wherein the light source is arranged such that the whole tile remains illuminated by the input beam whilst at least one of the input beam and the spatial light modulator are moved relative to the other.

11. The holographic projector of claim 1, wherein a size of the at least one region of the SLM is smaller than a size of the SLM.

12. The holographic projector of claim 1, wherein the light source is arranged to illuminate all of the SLM and an area surrounding the SLM, optionally, wherein the holographic reconstruction does not move during the relative movement of the input beam and the spatial light modulator.

13. The holographic projector of claim 1, wherein the holographic reconstruction remains formed during the relative movement of the input beam and the spatial light modulator.

14. The holographic projector of claim 1, wherein the holographic reconstruction is formed at a light receiving surface, optionally, wherein the light receiving surface is spatially separated from the spatial light modulator, further optionally, wherein the light receiving surface is a diffuser.

15. The holographic projector of claim 1, wherein one or more of:
the light source emits at least partially spatially coherent light and/or emits monochromatic light, optionally, wherein the light source is a laser;
the SLM is arranged to spatially-modulate the phase and/or the amplitude of the input beam, and
the hologram displayed on the SLM is a computer-generated hologram, optionally, a Fourier hologram or a Fresnel hologram.

16. A head-up display, "HUD", comprising the holographic projector of claim 1.

17. A method of improving a holographically-reconstructed image, the method comprising:
displaying a hologram on a spatial light modulator, wherein the hologram comprises two or more tiles of an input hologram representative of an image to be reconstructed, each tile of the displayed hologram comprising at least a subset of pixels representative of a part of the input hologram, wherein at least one tile is a whole tile comprising a complete set of pixels representative of a whole of the input hologram;
illuminating at least one region of the spatial light modulator with an input beam;
spatially modulating the input beam in accordance with the hologram to form a holographic reconstruction; and
continually moving at least one of the input beam and the spatial light modulator relative to the other, while the holographic reconstruction remains formed, so that the input beam is incident at the plurality of different positions on the spatial light modulator at different points in time.

18. The method of claim 17, wherein the input beam is incident at t plurality of different positions within the integration time of the human eye.

* * * * *